United States Patent
Konishi et al.

(10) Patent No.: US 8,175,206 B2
(45) Date of Patent: May 8, 2012

(54) COMMUNICATION APPARATUS

(75) Inventors: Shinya Konishi, Tokyo (JP); Norio Arai, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 377 days.

(21) Appl. No.: 12/504,921

(22) Filed: Jul. 17, 2009

(65) Prior Publication Data

US 2009/0279654 A1 Nov. 12, 2009

(30) Foreign Application Priority Data

Apr. 8, 2008 (JP) ................................ 2008-200592

(51) Int. Cl.
*H04L 7/04* (2006.01)
*H04H 20/48* (2008.01)

(52) U.S. Cl. ......................................... 375/362; 381/7

(58) Field of Classification Search .................. 375/362, 375/355; 381/7
See application file for complete search history.

(56) References Cited

U.S. PATENT DOCUMENTS

| | | | | |
|---|---|---|---|---|
| 4,209,843 A | * | 6/1980 | Hyatt | 708/422 |
| 5,053,983 A | * | 10/1991 | Hyatt | 708/306 |
| 5,054,070 A | * | 10/1991 | Eckstein et al. | 381/7 |
| 6,097,770 A | * | 8/2000 | Bahai et al. | 375/343 |
| 6,278,755 B1 | * | 8/2001 | Baba et al. | 375/360 |
| 2003/0043947 A1 | * | 3/2003 | Zehavi et al. | 375/365 |
| 2009/0196387 A1 | * | 8/2009 | McCune, Jr. | 375/355 |

FOREIGN PATENT DOCUMENTS

JP 3792904 4/2006

* cited by examiner

*Primary Examiner* — David C. Payne
*Assistant Examiner* — Sarah Hassan
(74) *Attorney, Agent, or Firm* — Young & Thompson

(57) ABSTRACT

There is provided a communication apparatus capable of reducing power consumption. The communication apparatus in accordance with the present invention includes a synchronization detection block 30 which detects synchronization by performing a receiving process using a plurality of clocks whose phase differs from each other with respect to synchronization information contained in a first frame as well as identifies the synchronization detected clocks as candidate clocks to be selected; a clock phase selection block 40 which selects a sampling clock to be used for sampling of the transmission signal from the candidate clocks to be selected, selects a stop clock separated by a predetermined phase from the selected sampling clock, and outputs an instruction for the stop clock; and a clock gate unit 60 which, terminates supplying the stop clock from the plurality of clocks to the synchronization detection block 30 as well as supplies other clocks to the synchronization detection block 30. In the process of receiving a second frame following the first frame, the synchronization detection block 30 detects synchronization from the clocks other than the stop clock.

6 Claims, 10 Drawing Sheets

COMMUNICATION APPARATUS

BACKGROUND OF THE INVENTION

1. Field of the Invention

The present invention relates to a communication apparatus detecting synchronization using a multi-phase clock, and more particularly to a communication apparatus terminating a clock not required for sampling of a transmission signal.

2. Description of the Related Art

A wireless communication LSI is roughly divided into a radio frequency (RF) LSI and a baseband (BB) LSI. The radio frequency LSI performs analog processing on a signal received through an antenna. The baseband LSI performs digital processing on a transmission signal before modulation or after demodulation.

The high-speed synchronous communication between the radio frequency LSI and the baseband LSI causes a signal delay or a jitter in a transmission line therebetween. At this time, a problem arising when these LSIs are operated independently based on clock signals in asynchronous relation with each other is that an LSI at the receiving side does not receive data correctly. In order to receive data correctly, the LSI at the receiving side controls the phase of a clock used for receiving data. For example, Japanese Patent No. 3792904 discloses a method for the LSI at the receiving side to control the phase of a clock used for receiving data.

FIG. 10 is a block diagram illustrating an exemplary configuration of a receiving device disclosed in Japanese Patent No. 3792904, and more particularly illustrating a demodulation baseband section. A data identification timing signal generation circuit 114 detects a preamble signal based on the received signal and generates a data identification timing signal 115 in synchronism with the timing of detections. In response to the data identification timing signal 115, a circuit operation control signal generator 116 determines whether a preamble signal is received or a signal other than the preamble signal is received. For example, when the preamble signal is received, a binary digital signal of 1 is generated and when a signal other than the preamble signal is received, a binary digital signal of 0 is generated respectively as the circuit operation control signal 117. A clock recovery circuit 122 recovers a symbol clock 123 and a bit clock 124 based on the timing of generating the data identification timing signal 115. A determination unit 125 uses the symbol clock 123 and the bit clock 124 to determine the received signal 111 to output received data 126. Here, using a circuit operation control signal 117 as an enable signal, a clock recovery circuit 122 can perform the above clock recovery only when the preamble signal is received and, when a signal other than the preamble signal is received, can stop the clock recovery by continuously keeping the phase of a clock recovered in the past. By doing so, while the preamble signal is not received, the clock recovery can be turned off, thereby minimizing circuit power consumption.

Note that as a related technique, a digital interface standard between the radio frequency LSI and the baseband LSI and information such as digital interface configurations, symbol rates, and electrical characteristics between the radio frequency LSI and the baseband LSI are disclosed in DRAFT MIPI Alliance Standard for Dual Mode 2.5G/3G Baseband/RFIC Interface, Draft Version 3.09.04, 28 Oct. 2007, http://www.mipi.org/.

However, the receiving device disclosed in Japanese Patent No. 3792904 is configured such that the data identification timing signal generation circuit 114 detects where the preamble is during signal receiving, and the circuit operation control signal 117 triggers the clock recovery circuit 122 to turn on or off. In this way, the clock recovery circuit 122 is operated only when the preamble signal is received. It is therefore necessary to operate the clock recovery circuit 122 to establish synchronization each time the preamble signal is received.

This is because the communication method using the preamble disclosed in Japanese Patent No. 3792904 is described by assuming clock recovery, and thus the master clock frequency and the symbol clock phase for data latch need to be adjusted for each frame. Therefore, although the receiving device disclosed in Japanese Patent No. 3792904 can reduce power consumption by terminating the clock recovery circuit 122 during the period while data is being received, the problem is that clock needs to be recovered to establish synchronization for each frame, thus wasting power.

SUMMARY

1. The communication apparatus in accordance with the present invention synchronously detecting and receiving a framed transmission signal, the communication apparatus including: a synchronization detection block receiving a frame to sample data included in said frame by using a plurality of clocks having different phases from each other, a clock phase selection block coupled to said synchronization detection block to identify a first clock group consisting of a clock or clocks included in said plurality of clocks and to be stopped based on an eye opening ratio of an eye pattern relative to said frame; and a clock gate unit coupled to said clock phase selection block and said synchronization detection block to stop supplying said first clock group to said synchronization detection section, said synchronization detection block sampling said data without using said first clock group after said clock gate unit stops supplying said first clock group.

According to the communication apparatus in accordance with the present invention, in the process of receiving the first frame, a plurality of clocks are used to detect synchronization and to identify the synchronization detected clocks as candidate clocks to be selected. Then, a sampling clock to be used for sampling of the transmission signal is selected from the identified candidate clocks to be selected and a stop clock separated by a predetermined phase is selected from the selected sampling clock. Then, supplying the stop clock is terminated. Afterward, in the process of receiving a second frame following the first frame, synchronization is detected from the clocks other than the stop clock. Therefore, the synchronization detection process in the process of receiving a second frame following the first frame can further reduce LSI power consumption by terminating supplying an unnecessary stop clock.

The communication apparatus in accordance with the present invention can provide a communication apparatus capable of reducing power consumption by terminating supplying an unnecessary stop clock during the synchronization detection process.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
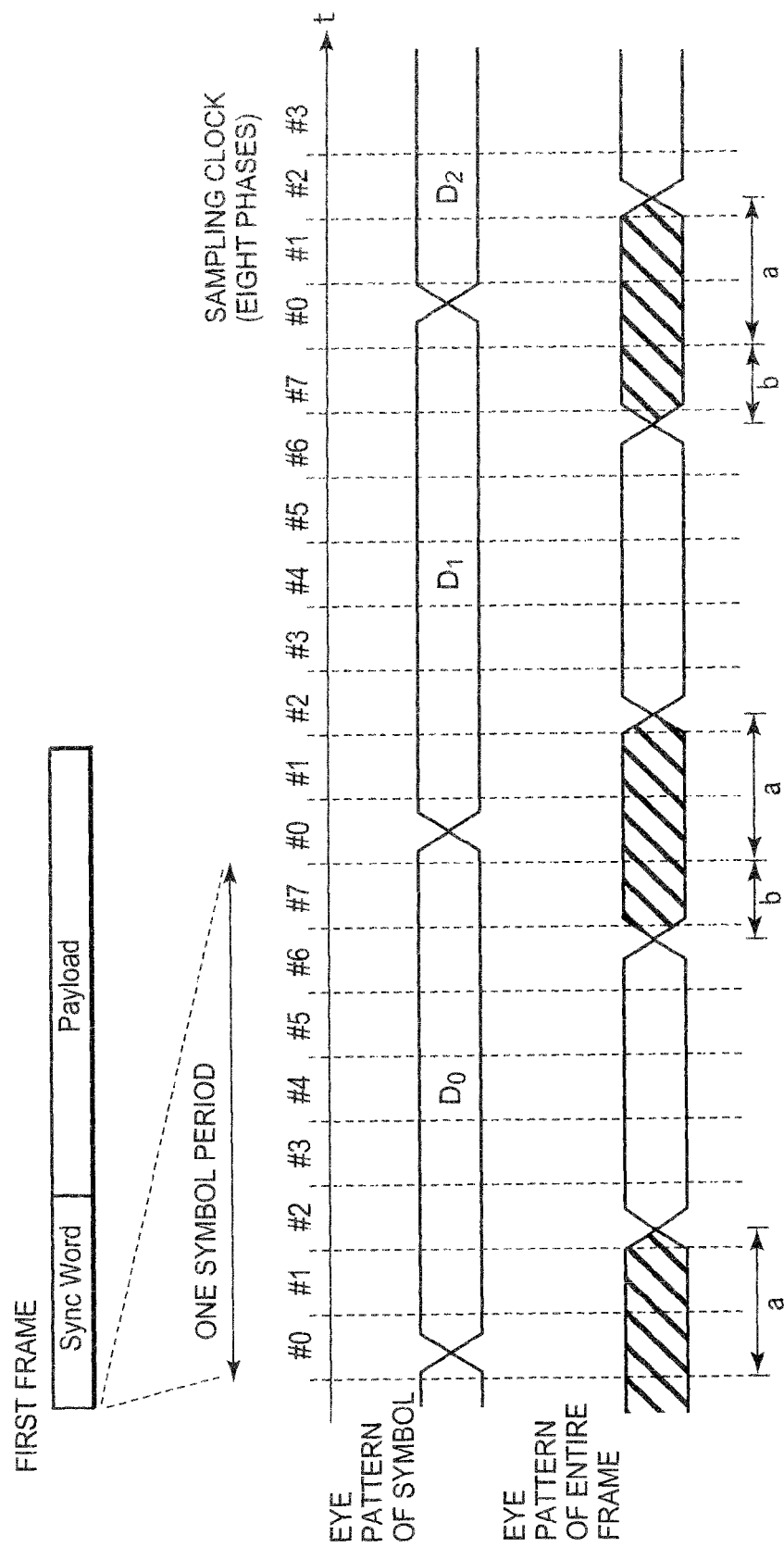
FIG. 1 is a drawing explaining an eye pattern of an entire frame in accordance with the present invention.

Before describing exemplary embodiments applying the present invention, an outline of the operation in accordance with the present invention will be described with reference to FIGS. 1 and 2. FIG. 1 is a drawing explaining an eye pattern of a transmission signal of an entire frame in accordance with the present invention. According to the present invention, a transmission signal is divided into frames, and a frame has a data sequence containing a synchronization word (Sync Word) area and a payload area. The synchronization word area contains synchronization word data preliminarily set by the system. The payload area contains data to be processed by the system. The system sends a synchronization word followed by the payload. The synchronization word is used to manage the units of payload transmission. The present invention is configured to use a frequency of eight times the symbol rate to sample a transmission signal. In other words, a sampling clock of eight phases per symbol (see #0 to #7 in the figure) is used to sample the transmission signal. It should be noted that the frame configuration is not limited to the above described configuration, but may be a configuration having a preamble for establishing synchronization and data proceeded by the preamble.

The eye pattern of the entire frame illustrated in FIG. 1 is a trace formed by folding and superimposing all data signals contained in a frame for each symbol. More specifically, when a symbol is one bit, a frame is made of, for example, 128 bits. Here, when a symbol transmission rate (symbol rate) is set to 312 MHz, it takes 3.2 ns to transmit one symbol. An eye pattern measuring instrument can be used to extract the waveform every 3.2 ns corresponding to a symbol for each symbol contained in the entire frame, and then superimpose 128 symbol waveforms to observe the eye pattern of the entire frame. If the clock fluctuates by jitter, sampled data also fluctuates accordingly. For this reason, when a data signal is folded and superimposed for each symbol for display, the jitter component of the individual symbol is added, and thus, there may occur a jitter component spreading across a data change point in the eye pattern of the entire frame. The wide spreading jitter components occurring in the eye pattern of the entire frame are illustrated by a shaded area in FIG. 1.

According to the present invention, the eye opening ratio of the eye pattern of the entire frame is defined as a ratio of the component other than the jitter component accounting for the time period corresponding to a symbol. More specifically, in FIG. 1, when the time periods related to the jitter component (shaded area in the figure) is a and b respectively, the eye opening ratio (EYER) is defined by the following expression 1.

$$EYER = 1 - (a+b)/t \qquad \text{[Expression 1]}$$

For example, if the time period t corresponding to a symbol is 3.2 ns, the value of a is 0.8 ns, and the value of b is 0.4 ns, the eye opening ratio (EYER) is 0.625.

Figure 2:
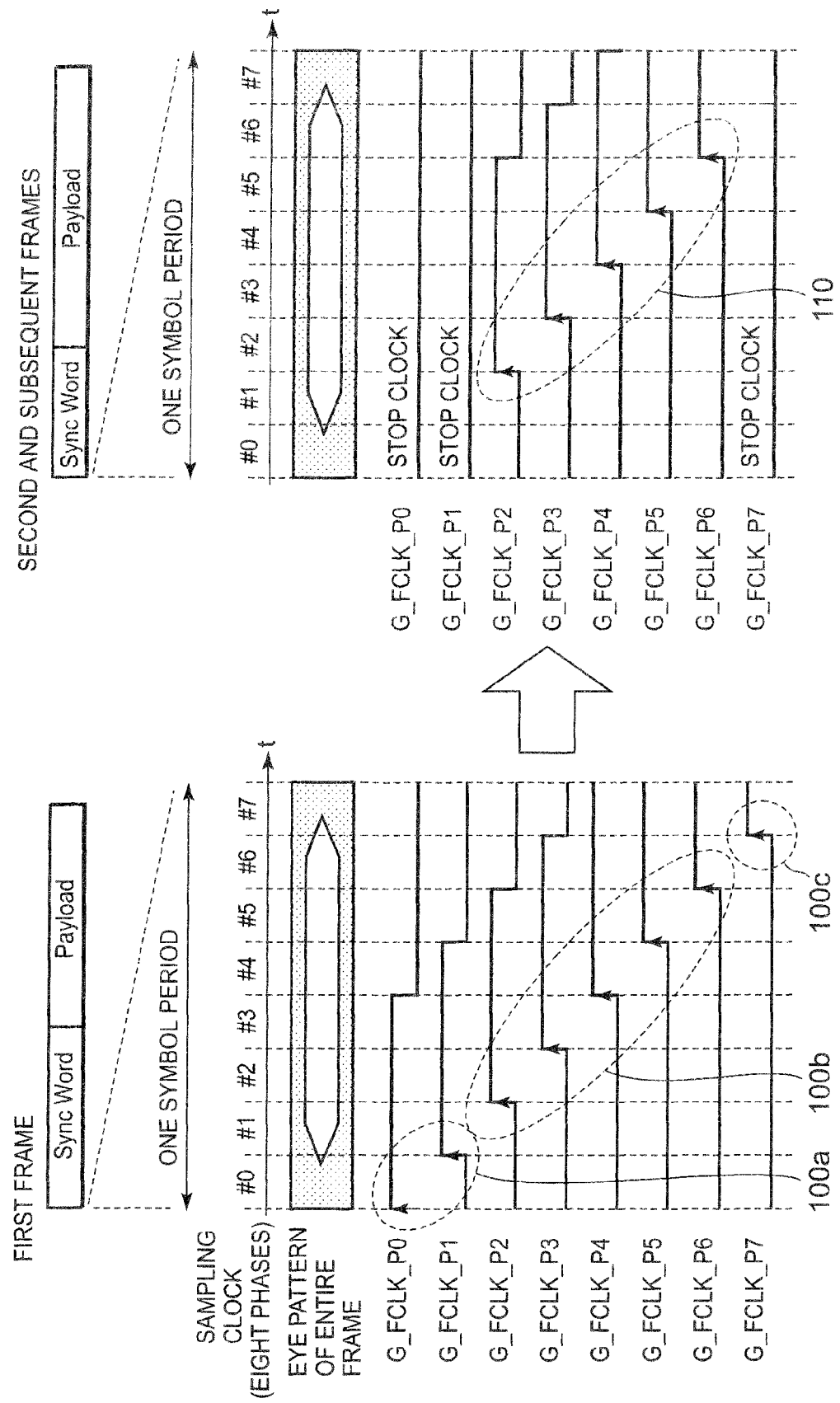
FIG. 2 is a drawing explaining an outline of operation in accordance with the present invention.

FIG. 2 is a drawing explaining an outline of operation in accordance with the present invention. The communication apparatus in accordance with the present invention performs a first frame receiving using, for example, eight clocks G_FCLK_P0 to 7 to detect synchronization. Moreover, the communication apparatus identifies the synchronization detected clocks as the candidate clocks to be selected. Subsequently, the communication apparatus selects a sampling clock to be used for sampling of the transmission signal from the identified candidate clocks to be selected, and selects a stop clock separated by a predetermined phase from the selected sampling clock. Then, the communication apparatus terminates supplying the stop clock. More specifically, according to the example illustrated in the figure, the communication apparatus selects, for example, a clock G_FCLK_P4 as the sampling clock to be used for sampling of the transmission signal. Then, the communication apparatus selects, for example, the clocks G_FCLK_P0, G_FCLK_P1, and G_FCLK_P7 separated by three phases from the selected sampling clock G_FCLK_P4 as the stop clock respectively. At this time, the clocks (G_FCLK_P2, G_FCLK_P3, G_FCLK_P4, G_FCLK_P5, and G_FCLK_P6) in the range 100b enclosed by a broken line around the selected sampling clock G_FCLK_P4 are clocks with its clock edge having a high possibility of sampling safely. In contrast, the clocks (G_FCLK_P0, G_FCLK_P1, and G_FCLK_P7) in the ranges 100a and 100c enclosed by a broken line selected as the stop clock respectively are clocks with its clock edge being in contact with a jitter component and thus dangerous for sampling.

Therefore, during the first frame receiving, the communication apparatus keeps only the clocks having a high possibility of sampling safely, and terminates the other unnecessary clocks. Subsequently, the communication apparatus performs a receiving process on second and subsequent frames following the first frame to detect synchronization from the clocks other than the stop clock. With reference to the example illustrated in the figure, during the second frame receiving, the communication apparatus uses the clocks (G_FCLK_P2, G_FCLK_P3, G_FCLK_P4, G_FCLK_P5, and G_FCLK_P6) in the range 110 enclosed by a broken line to detect synchronization and terminates the other clocks (G_FCLK_P0, G_FCLK_P1, and G_FCLK_P7) without using them as the synchronization detection process. Therefore, the synchronization detection process of second and subsequent frames can further reduce LSI power consumption by terminating supplying unnecessary stop clocks.

First Embodiment

Figure 3:
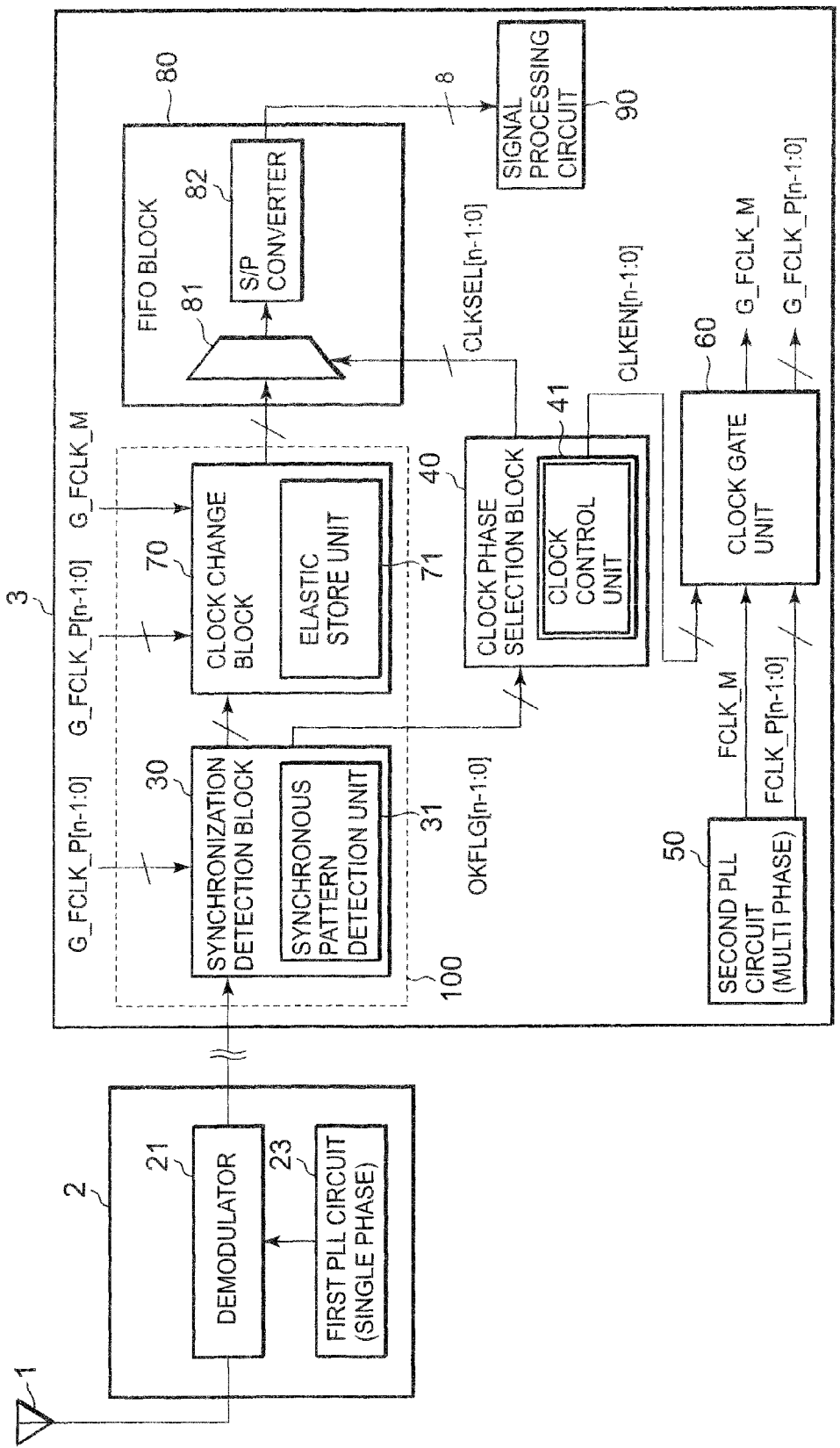
FIG. 3 is a block diagram of a receiving device in accordance with a first embodiment of the present invention.

Hereinafter, an exemplary embodiment applying the present invention will be described in detail with reference to drawings. First, with reference to FIG. 3, the configuration of the communication apparatus (specifically receiving device) in accordance with the present invention will be described. As illustrated in FIG. 3, the receiving device has an antenna 1, a radio frequency (RF) section 2, and a digital baseband (DBB) section 3.

The RF section 2 has a demodulator 21 and a first PLL (Phase Locked Loop) circuit 23. The demodulator 21 generates a data signal by demodulating a radio signal received through the antenna 1. The data signal is, for example, a parallel data having a bit width of 8 bits. The demodulator 21 converts, for example, the parallel data to serial data to output the data as a transmission signal. The transmission signal is, for example, a data sequence having a bit width of 1 bit.

As described above, the transmission signal in accordance with the present invention is divided into frames, and the data sequence contains a synchronization word (Sync Word) area and a payload area. The system sends the synchronization word followed by the payload. The first PLL circuit 23 outputs, for example, a single-phase first clock subsequent to the synchronization word. The first clock is used for data sequence processing by the demodulator 21.

The DBB section 3 includes a synchronization detection block 30, a clock phase selection block 40, a second PLL circuit 50, a clock gate unit 60, a clock change block 70, a FIFO unit 80, and a signal processing circuit 90. Note that the detail about the portion 100 enclosed by a broken line including the synchronization detection block 30 and the clock change block 70 will be described later.

The synchronization detection block 30 has a synchronous pattern detection unit 31. The synchronous pattern detection unit 31 receives a transmission signal based on a plurality of clocks whose phase is different from each other. Then, the synchronous pattern detection unit 31 samples a synchronization word as synchronization information contained in the received transmission signal based on a plurality of clocks whose phase is different from each other, and compares the sampling results and a preliminarily set synchronous pattern. Then, the synchronous pattern detection unit 31 identifies the clock which successfully sampled the synchronization word matching the synchronous pattern, as the candidate clock to be selected from the plurality of clocks. In other words, the synchronous pattern detection unit 31 samples the input synchronization word using the n number of clocks G_FCLK_P[n−1:0] whose phase is different from each other. The synchronous pattern detection unit 31 outputs, to the clock phase selection block 40, a signal OKFLG [n−1:0] indicating the clock which correctly sampled the preliminarily set synchronous pattern from the plurality of n number of clocks whose phase is different from each other. For example, the bit of the signal OKFLG [n−1:0] is 1 for the clock which correctly sampled the preliminarily set synchronous pattern, and the bit thereof is 0 for the clock which could not correctly sample the preliminarily set synchronous pattern. Note that the clock G_FCLK_P [n−1:0] is a multi-phase clock gated by a clock gate unit 60 (described later). The detail about the gating by the clock gate unit 60 will be described in detail later.

Figure 4:
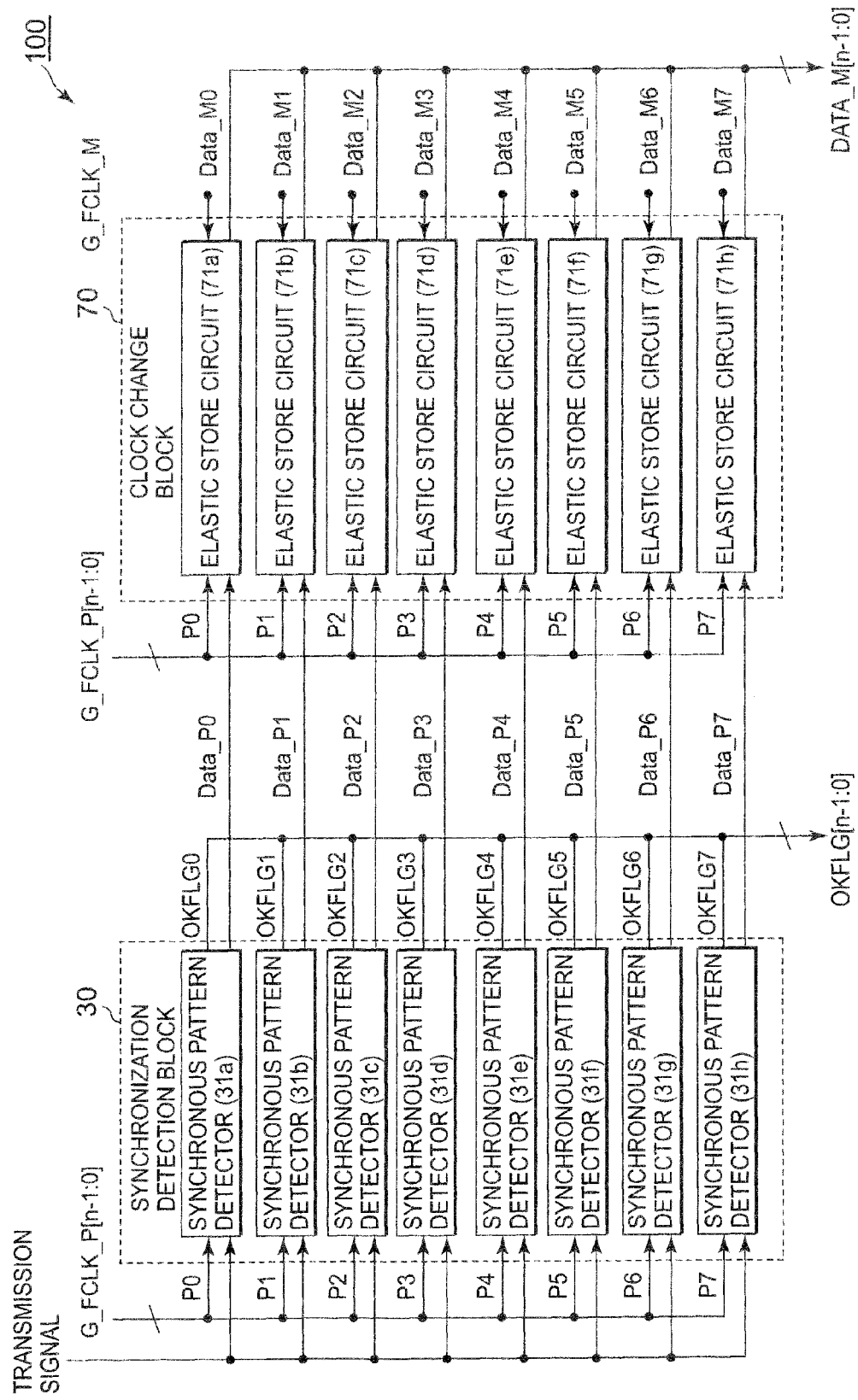
FIG. 4 is a block diagram of a synchronization detection block and a clock change block in accordance with the first embodiment of the present invention.

With reference to FIG. 4, the more detailed configuration of the synchronization detection block 30 will be described. The range of the portion 100 enclosed by the broke line in FIG. 3 is illustrated in detail in FIG. 4. FIG. 4 is an exemplary block diagram illustrating the configuration of the synchronization detection block 30 and the clock change block 70 (described later). As illustrated in the figure, the synchronization detection block 30 includes synchronous pattern detection unit 31 having a plurality of synchronous pattern detectors 31a to 31h. According to the present embodiment, the synchronous pattern detectors 31a to 31h perform a character synchronization using a synchronization word. In FIG. 4, the clock G_FCLK_P[n−1:0] has eight phases, and the eight clocks G_FCLK_P0 to 7 whose phase differs from each other are used to operate the synchronous pattern detectors 31a to 31h.

When a transmission signal is received, the synchronous pattern detectors 31a to 31h sample the synchronization word contained in the transmission signal in response to the clocks G_FCLK_P0 to 7. More specifically, the synchronous pattern detectors sample the synchronization word of the transmission signal at a rising edge (or falling edge) of the clock. Then, the synchronous pattern detectors 31a to 31h compare a preliminarily set and stored synchronous pattern with the sampling result of the synchronization word contained in the transmission signal. Note the preliminarily set synchronous pattern is stored in a storage unit such as a register provided by the DBB section 3. Subsequently, the synchronous pattern detectors 31a to 31h identify the clock which successfully sampled the synchronization word matching the synchronous pattern from the clocks G_FCLK_P0 to 7. When the preliminarily set synchronous pattern was correctly sampled using the supplied clock, the respective one of the synchronous pattern detectors 31a to 31h outputs the OKFLG signal, for example, indicating 1, and when the preliminarily set synchronous pattern could not be correctly sampled using the supplied clock, the respective one of the synchronous pattern detectors outputs the OKFLG signal, for example, indicating 0. Further more specifically, for example, the synchronous pattern detector 31a uses the clock G_FCLK_P0 to sample the synchronization word contained in the transmission signal. Then, the synchronous pattern detector 31a compares the result of sampling the synchronization word using the clock G_FCLK_P0 with the preliminarily set synchronous pattern stored in the storage unit. When the sampling result matches the synchronous pattern, the synchronous pattern 31a determines that the clock G_FCLK_P0 is the one which successfully sampled the preliminarily set synchronous pattern, and outputs the OKFLG0 signal indicating "1". Subsequently, the other synchronous pattern detectors 31b to 31h perform the similar operation and output OKFLG1 to OKFLG7 respectively. Therefore, the signal OKFLG[n−1:0] illustrated in FIG. 4 is a parallel signal containing a plurality of bits where bit 1 corresponds to the clock which correctly sampled the preliminarily set synchronous pattern, and bit 0 corresponds to the clock which could not correctly sample the preliminarily set synchronous pattern. The synchronization detection block 30 outputs the signal OKFLG[n−1:0] to the clock phase selection block 40. An example of the parallel signal OKFLG [n−1:0] from the synchronous pattern detectors 31a to 31h includes (OKFLG7, OKFLG6, OKFLG5, ... OKFLG0)=(0, 1, 1, 1, 1, 1, 0, 0). The leftmost bit of the bit sequence indicates the most significant hit (MSB) and the rightmost bit thereof indicates the least significant bit (LSB) respectively. This example indicates that the third to seventh clocks starting with LSB, or clocks G_FCLK_P2 to 6 correctly detected the synchronization word.

The synchronous pattern detectors 31a to 31h perform the process of receiving a first frame of transmission signal using all the clocks G_FCLK_P0 to 7. Then, as described later, after the clock gate unit 60 gates the clock G_FCLK_P[n−1:0], the synchronous pattern detectors operate using only the clock G_FCLK_P[n−1:0] other than the stop clock selected by the clock phase selection block 40. For example, if the three clocks (G_FCLK_P0, G_FCLK_P1, and G_FCLK_P7) are selected as the stop clock from the eight clocks G_FCLK_P0 to 7, the remaining five clocks (G_FCLK_P2, G_FCLK_P3, G_FCLK_P4, G_FCLK_P5, and G_FCLK_P6) are used for operation. The clock G_FCLK_P[n−1:0] indicates the above described five clocks G_FCLK_P2 to 6.

The clock phase selection block 40 selects a clock to be used for sampling of the transmission signal from the clocks G_FCLK_P[n−1:0] which successfully sampled the synchronization word matching the synchronous pattern. Then, the clock phase selection block 40 selects the clocks separated by a predetermined phase from the selected sampling clock as the stop clock, and outputs an instruction for terminating the stop clock. The clock phase selection block 40 has a clock control unit 41. The clock control unit 41 performs control for terminating the stop clock.

More specifically, the clock phase selection block 40 receives the signal OKFLG [n−1:0] outputted from the synchronization detection block 30 and selects a clock to be used for sampling from the plurality of clocks G_FCLK_P[n−1:0]. The clock phase selection block 40 outputs the selection signal CLKSEL [n−1:0] indicating the selected signal to a selector 81 of the FIFO unit 80. The selection signal CLKSEL [n−1:0] is a parallel signal indicating an output from the clock phase selection block 40. The selection signal CLKSEL [n−1:0] is transmitted in parallel through the n number of signal lines. For example, 1 indicates a clock selected as the sampling clock, and 0 indicates a clock not selected as the sampling clock. For example, assume that a single-phase clock G_FCLK_P[n−1:0] is selected from the 8-phase clock G_FCLK_P[n−1:0] and consider a case where the clock phase selection block 40 receives a signal (OKFLG7, OKFLG6, OKFLG5, . . . OKFLG0)=(0, 1, 1, 1, 1, 1, 0, 0) as the signal OKFLG [n−1:0] outputted from the synchronization detection block 30. In this case, the clock phase selection block 40 selects the clock G_FCLK_P4 capable of sampling safely and located in the middle of the selectable clocks G_FCLK_P2 to 6. Then, the clock phase selection block 40 outputs the signal (CLKSEL7,CLKSEL6,CLKSEL5, . . . CLKSEL0)=(0, 0, 0, 1, 0, 0, 0, 0) as the selection signal CLKSEL [n−1:0]. The leftmost bit is the most significant bit (MSB) indicating whether the clock G_FCLK_P7 inputted into the synchronous pattern detector 31a is selected or not. The rightmost bit is the least significant bit indicating whether the clock G_FCLK_P0 inputted into the synchronous pattern detector 31h is selected or not. More specifically, in this example, the clock phase selection block 40 sets the fifth but starting with LSB to 1, indicating that the clock phase selection block 40 selects the clock G_FCLK_P4 inputted into the synchronous pattern detector 31e. In other words, the fifth clock G_FCLK_P4 starting with LSB is used to operate the selector 81.

Further, the clock phase selection block 40 selects the clock separated by a predetermined phase from the selected sampling clock as the stop clock according to the selected sampling clock and the eye opening ratio of the eye pattern of the transmission signal. Here, the eye opening ratio of the eye pattern of the transmission signal is an eye opening ratio of the eye pattern of the entire transmission signal contained in the frame. The eye opening ratio can be set to, for example, 0.55. Assuming the communication between the two LSIs operating in response to a high-speed clock multiplied from the same reference clock, a major misalignment in relative position does not occur between the eye pattern of the transmission signal and the sampling clock, and the eye is not closed (that is, the eye opening ratio is not reduced). For this reason, the range of a predetermined phase having a high possibility of sampling safely is preliminarily set around the selected sampling clock according to the eye opening ratio. The selected sampling clock is a phase determined to have a high possibility of sampling the transmission signal safely, and thus the phase contained in the range of a predetermined phase around the selected sampling clock is a phase having a high possibility of sampling the transmission signal safely. In other words, it is considered that the termination of the phases other than the phases near the selected sampling clock does not affect the receiving characteristic. Therefore, the number of predetermined phases specifying the range of the predetermined phase can be set so as to exclude the phases near the selected sampling clock according to the selected sampling clock and the eye opening ratio of the eye pattern of the transmission signal, and is preliminarily stored in a storage unit such as a register provided by the clock phase selection block 40.

The clock control unit 41 receives the signal OKFLG [n−1:0] outputted from the synchronization detection block 30 and outputs the enable signal CLKEN [n−1:0] instructing the stop clock to be terminated from the clocks G_FCLK_P[n−1:0] to the clock gate unit 60. The enable signal CLKEN [n−1:0] is a parallel signal indicating an output from the clock control unit 41. The enable signal CLKEN[n−1:0] is transmitted in parallel through the n number of signal lines. For example, 1 indicates a clock not to be terminated of the clocks G_FCLK_P[n−1:0] and 0 indicates a clock to be terminated thereof. For example, in order to terminate three phases of clocks G_FCLK_P[n−1:0] of the eight phases of clocks G_FCLK_P[n−1:0], the clock control unit 41 outputs the enable signal CLKEN [n−1:0] as (CLKEN7, CLKEN6, CLKEN5, . . . CLKEN0)=(0, 1, 1, 1, 1, 1, 0, 0). The leftmost bit is the most significant bit (MSB) indicating whether the clock G_FCLK_P7 inputted into the synchronous pattern detector 31a is terminated or not.

The rightmost bit is the least significant bit (LSB) indicating whether the clock G_FCLK_P0 inputted into the synchronous pattern detector 31h is terminated or not. In this example, the clock control unit 41 outputs a signal indicating that the clock control unit 41 does not terminate the clocks G_FCLK_P2 to 6 inputted into the synchronous pattern detector 31e and terminates the other clocks (G_FCLK_P0, P1, and P7).

The second PLL circuit 50 generates a reference clock FCLK_M and a multi-phase clock FCLK_P[n−1:0]. The second PLL circuit 50 outputs the generated reference clock FCLK_M and multi-phase clock FCLK_P[n−1:0] to the clock gate unit 60. The reference clock FCLK and the multi-phase clock FCLK_P[n−1:0] in accordance with the present embodiment are a high-speed clock multiplying the reference clock. Moreover, the multi-phase clock FCLK_P[n−1:0] is made of a plurality of clocks which are the same in speed and differ in phase by 360°/n from each other. The present embodiment describes assuming that n is 8. For this reason, the bit width of an output from the second PLL circuit 50 includes a bit width of 1 bit and a bit width of 8 bits, and each bit width corresponds to the respective phase of clock. Further, according to the present embodiment, the first PLL circuit 23 and the second PLL circuit 50 generate the clocks which are multiplied from the same reference clock, have the same frequency, and are in asynchronous relation with each other.

The clock gate unit 60 receives the enable signal CLKEN [n−1:0] from the clock control unit 41 and gates the reference clock FCLK_M and the multi phase clock FCLK_P[n−1:0] supplied by the second PLL circuit 50. More specifically, the clock gate unit 60 gates the multi-phase clock FCLK_P[n−1:0] to terminate supplying the above described stop clock of the multi-phase clock FCLK_P[n−1:0] to the synchronization detection block 30 as well as to supply the clocks other than the stop clock to the synchronization detection block 30 as the G_FCLK_P[n−1:0]. Further, the clock gate unit 60 terminates supplying the above described stop clock of the multi-phase clock FCLK_P[n−1:0] to the clock change block 70 as well as supplies the clocks other than the stop clock to the clock change block 70 as the G_FCLK_P[n−1:0]. Moreover, the clock gate unit 60 gates the reference clock FCLK_M to output as the clock G_FCLK_M. The reference clock FCLK_M is a reference clock for operating the system. When the system is to be terminated, the clock gate unit 60 outputs the clock G_FCLK_M to terminate supplying the reference clock.

Figure 5:
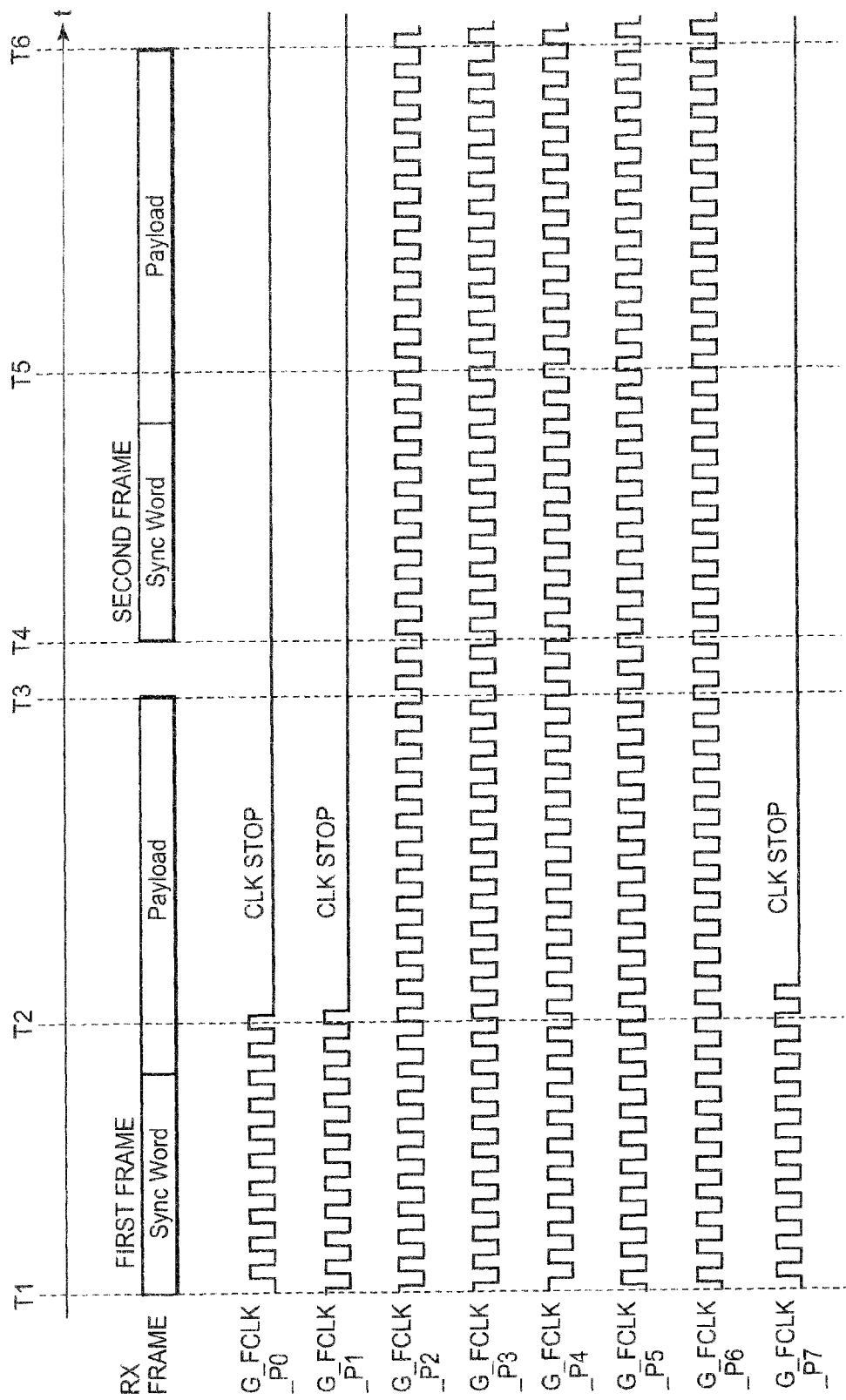
FIG. 5 is a drawing explaining an aspect of clock gating operation by a clock gate unit in accordance with the first embodiment of the present invention.

Now, With reference to FIG. 5, an aspect of clock gating operation by the clock gate unit 60 will be described. FIG. 5 is a drawing explaining an aspect of clock gating operation by a clock gate unit 60 when the clock G_FCLK_P[n−1:0] has eight phases. As illustrated in the figure, the receive (RX) frame indicating the transmission signal contains a synchronization word (Sync Word) and payload. The synchronization word followed by payload is received.

With reference to FIG. 5, the synchronization detection block 30 first receives the first frame of transmission signal at time T1, and starts operation using all the clocks G_FCLK_P [n−1:0]. The synchronization detection block 30 identifies the clock which successfully sampled the synchronization word matching the synchronous pattern from the clocks G_FCLK_P[n−1:0] and outputs the signal OKFLG [n−1:0] indicating the identified result to the clock phase selection block 40. The clock phase selection block 40 uses the signal OKFLG [n−1:0] indicating the identified result to select a clock to be used for sampling of the transmission signal from the clocks G_FCLK_P[n−1:0]. Then, the clock phase selection block 40 selects the clocks separated by a predetermined phase from the selected sampling clock as the stop clock. The clock control unit 41 of the clock phase selection block 40 receives the signal OKFLG [n−1:0] outputted from the synchronization detection block 30 and outputs the enable signal CLKEN [n−1:0] indicating the clock to be terminated of the clocks G_FCLK_P[n−1:0] to the clock gate unit 60. When the enable signal CLKEN [n−1:0] is received at time T2, the clock gate unit 60 terminates supplying the stop clock of the multi-phase clock FCLK_P[n−1:0] to the synchronization detection block 30 as well as supplies the clocks other than the stop clock to the synchronization detection block 30. In the example illustrated in the figure, the clock phase selection block 40 selects the clock G_FCLK_P4 as the sampling clock to be used for sampling of the transmission signal. Then, the clock phase selection block 40 selects, for example, the clocks (G_FCLK_P0, G_FCLK_P1, and G_FCLK_P7) separated by three phases from the selected sampling clock G_FCLK_P4 as the stop clock respectively. Therefore, during the first frame receiving, the clock gate unit 60 keeps only the clocks having a high possibility of sampling safely, and terminates the other unnecessary clocks.

As described above, according to the present embodiment, it is considered that the termination of the stop clock at the subsequent process of receiving the transmission signal does not affect the receiving characteristic. For this reason, the clock control unit 41 outputs the instruction for terminating the stop clock to the clock gate unit 60 at the subsequent receiving processes. In other words, according to the present embodiment, the stop clock is terminated at the subsequent synchronization detection process following the first frame.

When the second frame of transmission signal is received at time T4, the synchronization detection block 30 detects synchronization using a clock other than the stop clock selected by the clock phase selection block 40. In the example illustrated in the figure, five clocks (G_FCLK_P2, G_FCLK_P3, G_FCLK_P4, G_FCLK_P5, and G_FCLK_P6) are used to perform a synchronization detection process and the other three clocks (G_FCLK_P0, G_FCLK_P1, and G_FCLK_P7) are terminated without being used for synchronization detection process. Further, likewise, in the subsequent receiving process (not illustrated) following the second frame, the synchronization detection block 30 detects synchronization using a clock other than the stop clock selected by the clock phase selection block 40. Therefore, the synchronization detection process in the process of receiving a subsequent frame following the second frame can further reduce LSI power consumption by terminating supplying an unnecessary stop clock.

Now, return to FIG. 3 to continue the description. The clock change block 70 performs an asynchronous transfer process of receiving a data signal outputted from the synchronization detection block 30 using the clock G_FCLK_P[n−1:0] and transferring the received data signal to the reference clock G_FCLK_M. The circuits in a rear stage of the clock change block 70 operate using a single-phase reference clock G_FCLK_M. In contrast to this, the circuits in front of the clock change block 70 operate using a multi-phase clock G_FCLK_P[n−1:0], and thus the clock change block 70 performs the asynchronous transfer process to the reference clock G_FCLK_M.

As illustrated in FIG. 4, the clock change block 70 has an elastic store unit 71 including a plurality of elastic store circuits 71a to 71h. According to the present embodiment, the elastic store circuits 71a to 71h perform an asynchronous transfer process of receiving the inputted data signal using the clock G_FCLK_P[n−1:0] and transferring the received data signal to the reference clock G_FCLK_M. FIG. 4 illustrates an example of the clock G_FCLK_P[n−1:0] having eight phases, and the description will be given by assuming that the elastic store circuits 71a to 71h operate using the eight clocks G_FCLK_P0 to 7 whose phase differs from each other and the reference clock G_FCLK_M.

The elastic store circuits 71a to 71h illustrated in FIG. 4 sample the data signals Data_P0 to 7 outputted from the synchronous pattern detectors 31a to 31h using the clocks G_FCLK_P0 to 7. Then, an elastic store memory 73 (described later) is used to extend the data signals Data_P0 to 7. Then, the extended data signals are re-timed using the reference clock G_FCLK_M to be outputted as the Data_M0 to 7 to the FIFO unit 80. The Data_M[n−1:0] is a parallel signal indicating a signal outputted from the elastic store circuits 71a to 71h. The data signals Data_M0 to 7 corresponding to the plurality of elastic store circuits 71a to 71h are sent in parallel through the n number of signal lines. Note that according to the present embodiment, the data signals Data_P0 to 7 is data indicating payload.

Figure 6:
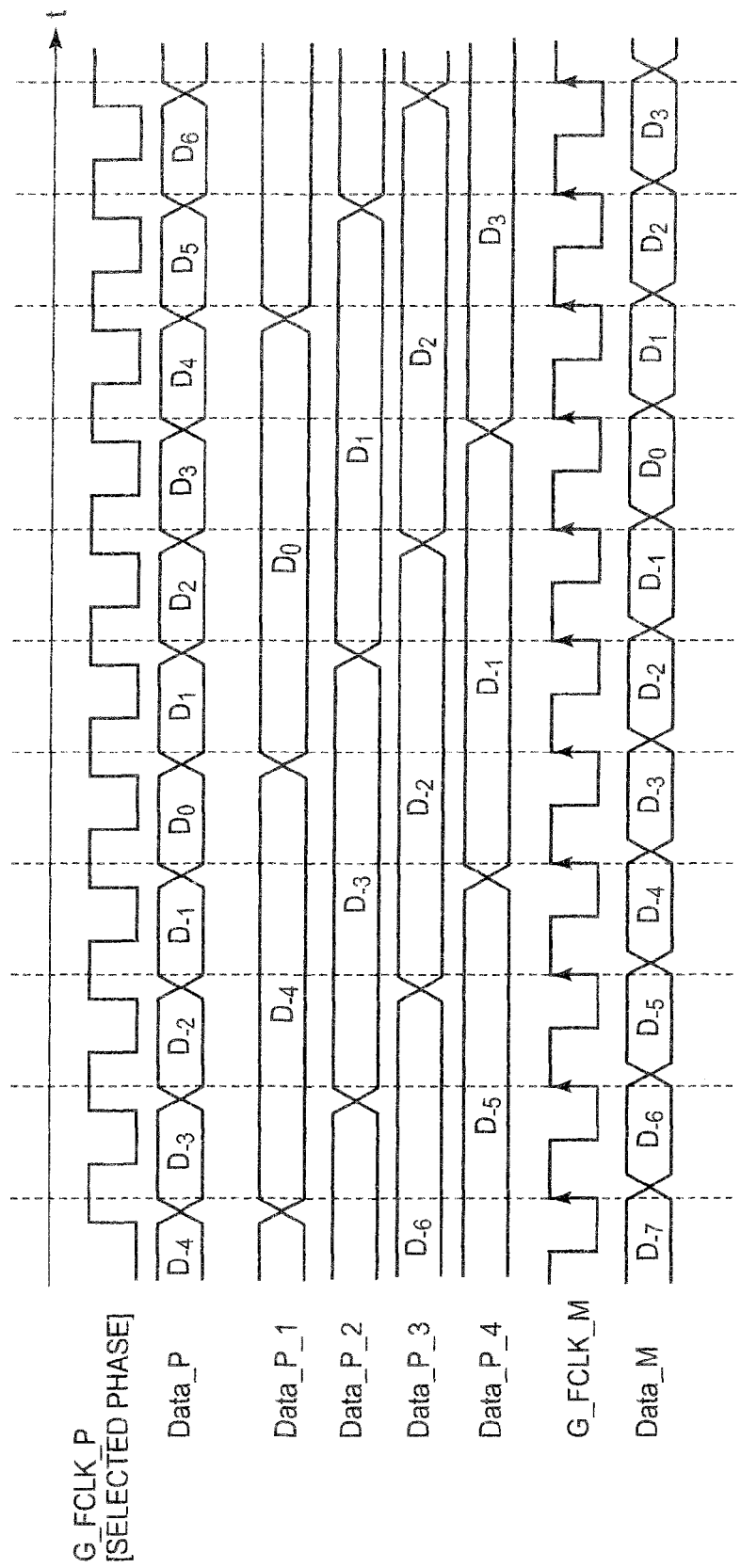
FIG. 6 is a timing chart illustrating an exemplary operation of an elastic store circuit in accordance with the first embodiment of the present invention.

FIG. 6 is a timing chart illustrating an exemplary operation of the elastic store circuits 71a to 71h. Note that in the figure, of the elastic store circuits 71a to 71h, the operation for only the elastic store circuits where the corresponding clock G_FCLK is selected is illustrated, but the operation for the elastic store circuits where the corresponding clock G_FCLK is not selected is not illustrated.

With reference to FIG. 6, the elastic store circuits 71a to 71h receive the data signal Data_P using the clock G_FCLK_P (selected phase) selected by the clock phase selection block 40. Then, the elastic store circuits 71a to 71h generate the data signals Data_P_1 to 4 extending the data signal Data_P as the reference of the clock G_FCLK_P (selected phase). According to the present embodiment, an individual data signal Data_P having the length for a period of the clock G_FCLK_P (selected phase) is extended to the data signals Data_P_1 to 4 having the length for four periods thereof. Then, the elastic store circuits 71a to 71h retime the extended data signals Data_P_1 to 4 using the reference clock G_FCLK_M to be outputted as Data_M0 to 7 to the FIFO unit 80. Thereby, the elastic store circuits 71a to 71h transfer the data signal Data_P from the clock G_FCLK_P (selected phase) to the reference clock G_FCLK_M to output the data signal Data_M. Thereby, the elastic store circuits 71a to 71h can extend the data signal Data_P for correct sampling using the reference clock G_FCLK_M no matter which clock G_G_FCLK_P is used to receive the data signal Data_P.

The FIFO unit 80 has a selector 81 and a serial/parallel converter (S/P converter) 82. The selector 81 selects a data signal outputted from the clock change block 70 based on the selection clock CLKSEL [n−1:0] and outputs the selected data to the S/P converter 82. The S/P converter 82 converts the serial data sampled by the FIFO unit 80 to parallel data in synchronism with the reference clock SCLK for internal circuits to be outputted.

The signal processing circuit 90 uses the parallel data outputted from the S/P converter 82 to perform a signal process (for example, decrypting the received data including path search) to generate a control signal or a data signal to be used by a circuit in a rear stage (not illustrated).

Figure 7:
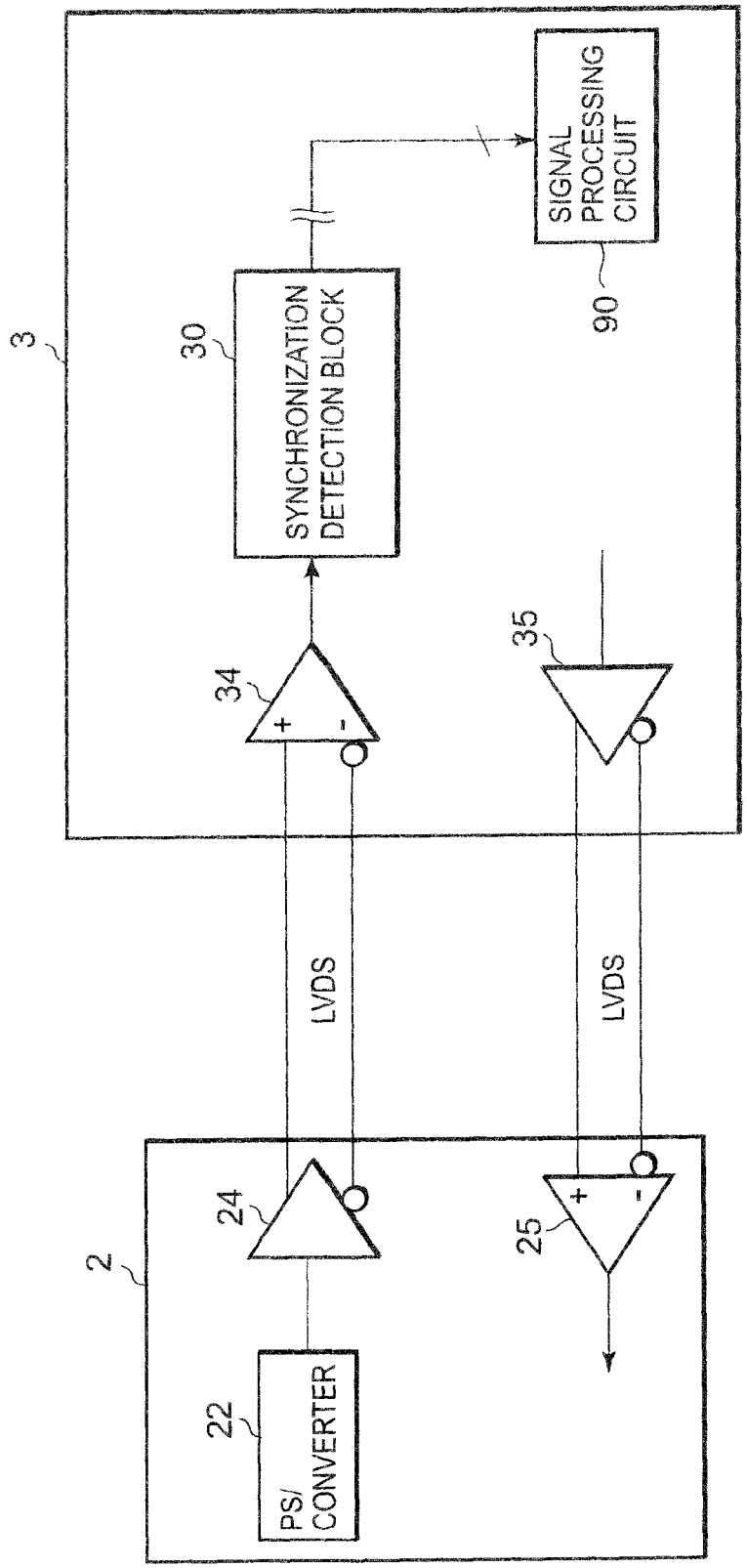
FIG. 7 is a block diagram illustrating a transmission signal transferred from an RF section to a DBB section in accordance with the first embodiment of the present invention.
Figure 8:
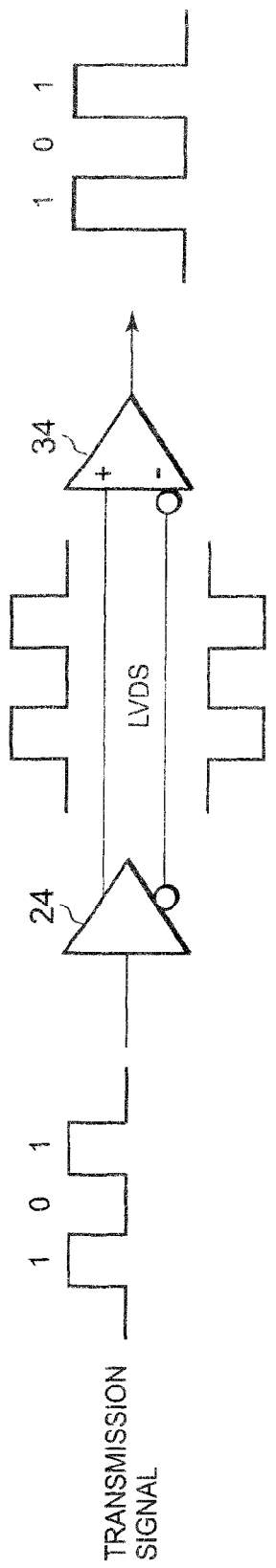
FIG. 8 is a drawing for explaining a method of transferring a transmission signal in accordance with the first embodiment of the present invention.

It is preferable that when a transmission signal is sent from the RF section 2 to the DBB section 3, the signal should be converted to a low voltage differential (LVDS) serial signal to be sent to the synchronization detection block. For example, as illustrated in FIG. 7, a driver 24 differentially amplifies a serial transmission signal outputted from a P/S converter 22, and a receiver 34 receives the differential signal. As illustrated in the figure, two signal lines are provided between the driver 24 and the receiver 34. Of the two signal lines, one line sends a transmission signal and the other line sends a signal inverting the transmission signal. When a low voltage transmission signal is transferred at high speeds, two signal lines can be used to send a differential signal to improve noise resistance. Moreover, it is preferable that when a transmission signal is sent from the DBB section 3 to the RF section 2, the signal should be converted to a low voltage differential (LVDS) serial signal to be sent to the synchronization detection block. For example, as illustrated in FIG. 8, the serial transmission signal from the DBB section 3 may be differentially amplified by the driver 35 so that the receiver 25 may receive the differential signal.

Second Embodiment

Figure 9:
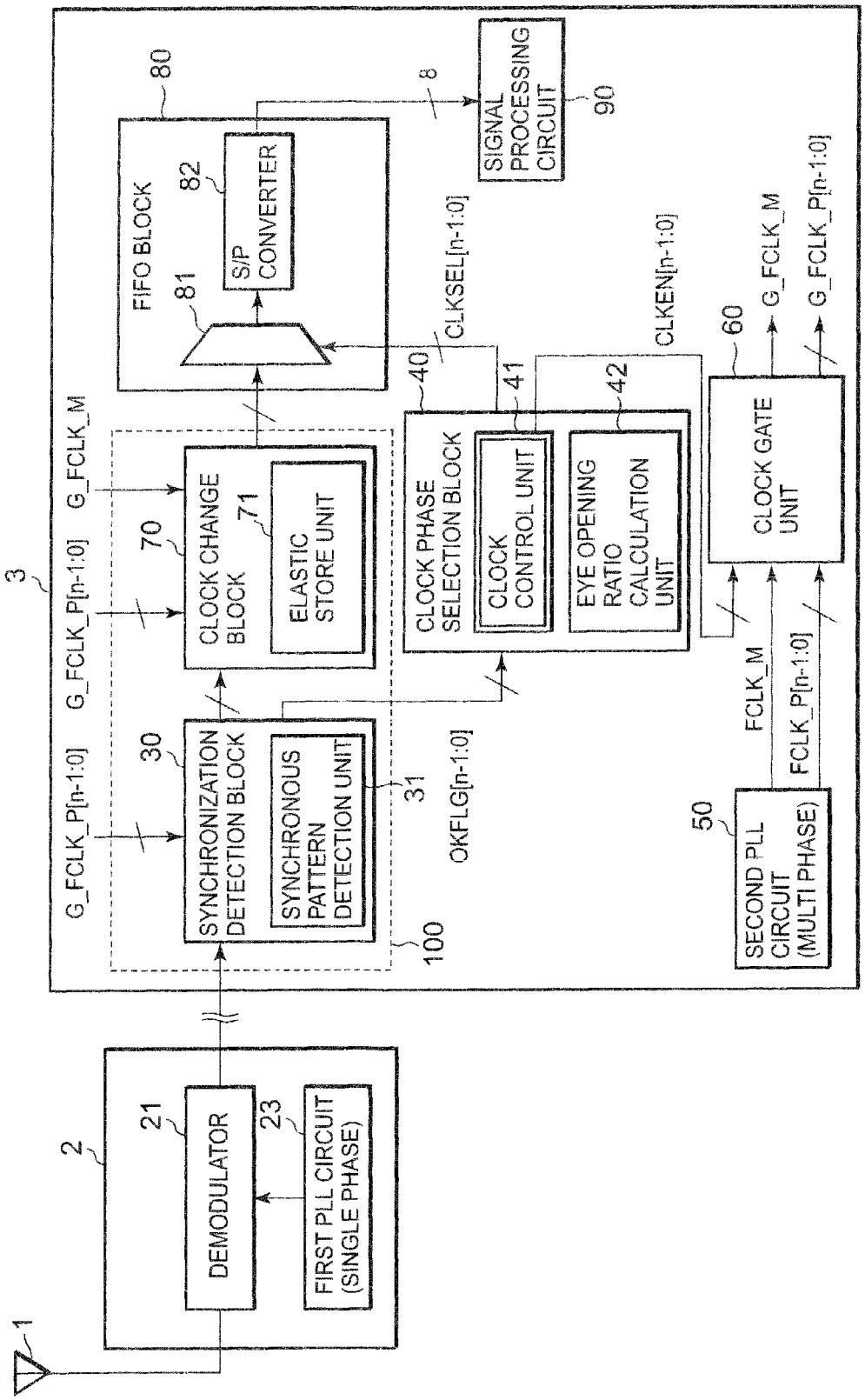
FIG. 9 is a block diagram of a receiving device in accordance with a second embodiment of the present invention.
Figure 10:
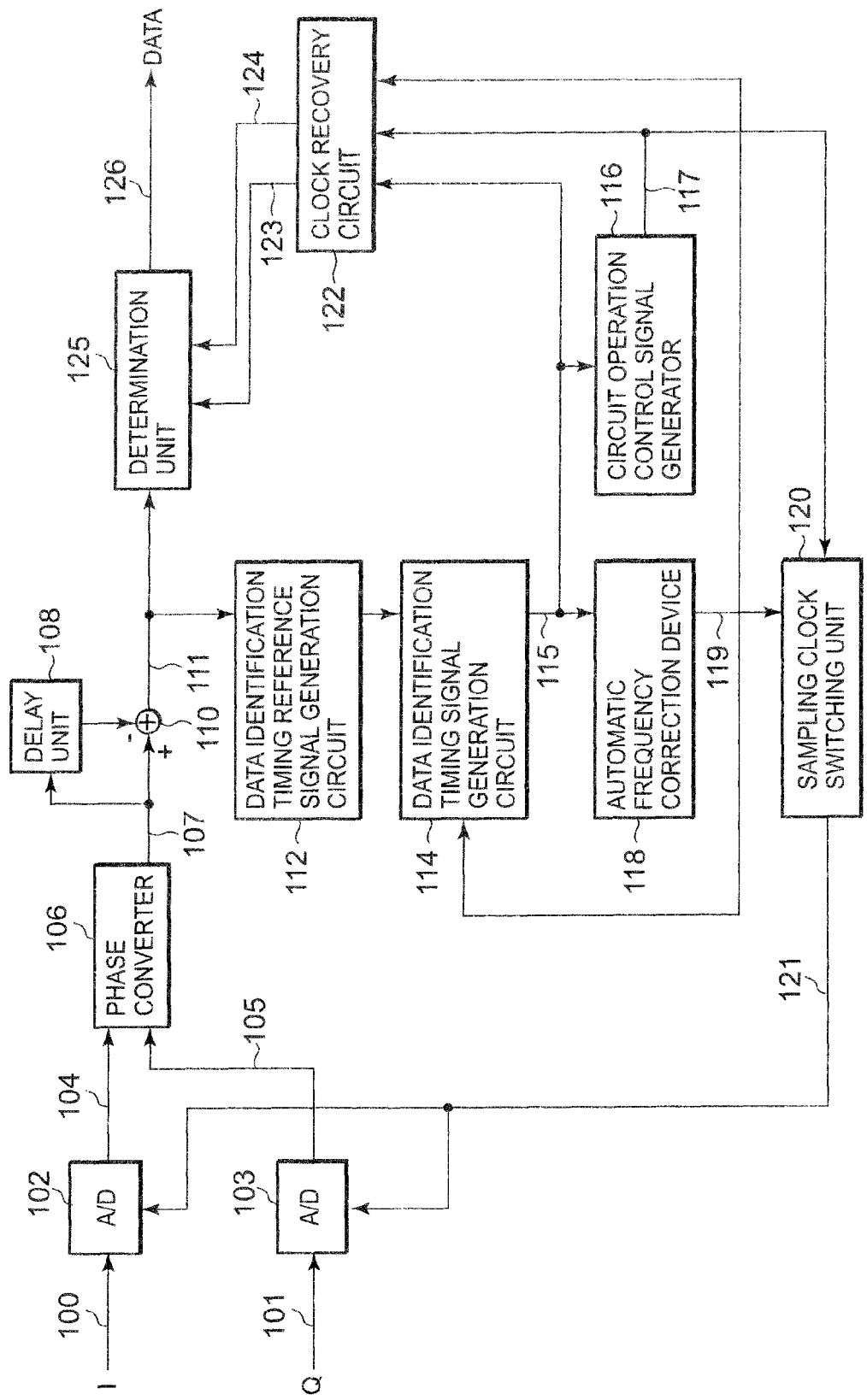
FIG. 10 is a drawing for explaining a related technique.

Hereinafter, with reference to FIG. 9, the configuration of the communication apparatus (specifically, a receiving device) in accordance with a second embodiment will be described. Note that the same reference numeral is assigned to a block having the same configuration as illustrated in FIG. 1 for the first embodiment described above. The receiving device has an antenna 1, a radio frequency (RF) section 2, and a digital baseband (DBB) section 3. Note that the configuration and function of the antenna 1 and the RF section 2 are the same as those in the above described first embodiment and the detailed description is omitted. As illustrated in the figure, the receiving device in accordance with the present embodiment is characterized in that the clock phase selection block 40 further includes an eye opening ratio calculation unit 42.

The eye opening ratio calculation unit 42 of the clock phase selection block 40 calculates the eye opening ratio of the eye pattern of the transmission signal. More specifically, when the first frame is received, the eye opening ratio calculation unit 42 calculates the eye opening ratio of the eye pattern of the transmission signal based on the result identified by the synchronization detection block 30. For example, assume that as a result of the synchronization detection process using eight clocks G_FCLK_P[n−1:0], the synchronization detection block 30 successfully detected the synchronization word using five clocks G_FCLK_P1 to 5. From this detected result, the eye opening ratio calculation unit 42 calculates the ratio of the correctly detected clocks accounting for the total number of clocks (that is, 5/8=0.65) as the eye opening ratio.

The clock phase selection block 40 has a storage unit such as a register for storing the eye opening ratio. The eye opening ratio calculation unit 42 stores the calculated eye opening ratio in the register or the like. The clock phase selection block 40 selects the stop clock according to the selected sampling clock and the eye opening ratio calculated by the eye opening ratio calculation unit 42. Therefore, the clock phase selection block 40 determines the number of predetermined phases for selecting the stop clock depending on the size of the calculated eye opening ratio. That is, if the range occupied by a jitter component is large in the eye pattern of the transmission signal (if the calculated eye opening ratio is small), the number of stop clocks increases. In contrast, if the range occupied by a jitter component is small, the number of stop clocks decreases.

As described above, in the communication apparatus synchronously detecting and receiving a framed transmission signal, the communication apparatus in accordance with the present invention uses a plurality of clocks to detect synchronization in the process of receiving a first frame as well as identify the synchronization detected clocks as the candidate clocks to be selected. Then, the communication apparatus selects a sampling clock to be used for sampling of the transmission signal from the identified candidate clocks to be selected and selects a stop clock separated by a predetermined phase from the selected sampling clock. Then, the communication apparatus terminates supplying the stop clock.

Then, in the process of receiving a second frame following the first frame, the communication apparatus detects synchronization using a clock other than the stop clock. The communication apparatus estimates an optimal sampling phase in the first frame, and in the second and subsequent frames, autonomously terminates the sampling clock associated with a jitter component of the eye pattern of the transmission signal. Thereby, the operation of a circuit determined to be unnecessary for receiving the second and subsequent frames for a plurality of frame periods can be terminated, and thus power consumption can be reduced.

Now, the advantages of the present invention will be described. The power consumption in the LSI can be expressed by the following expression. Pt denotes the switching probability. fCLK denotes the operating frequency. CL denotes the load carrying capacity. I0 denotes the current correction coefficients. S denotes the threshold voltage (Vt) correction coefficient. Here, the first term on the right side denotes the power consumption by a switching operation and the second term denotes the leak power $$P = p_t \cdot f_{CLK} \cdot C_L \cdot V_{DD}^2 + I_0 \cdot 10^{\frac{V_{th}}{S}} \cdot V_{DD} \qquad \text{[Expression 2]}$$

The present invention operates a phase near a clock having a high possibility of sampling safely, and terminates a clock such that a clock edge of the sampling clock is in contact with a jitter component of the eye pattern. Therefore, the clock having a phase determined to be unnecessary for synchronization detection process can be terminated to eliminate the need to unnecessarily operate the logic circuits (the synchronization detection block 30 and the clock change block 70) provided in front stage of the FIFO unit 80. For this reason, as understood from the expression 2, the unnecessary clock fCLK can be terminated to reduce power consumed by the first term on the right side.

It should be noted that the present invention is not limited to the above described embodiments and it will be apparent that various modifications can be made to the present invention without departing from the spirit and scope of the present invention.

It is apparent that the present invention is not limited to the above embodiments, but may be modified and changed without departing from the scope and spirit of the invention.

What is claimed is:

1. A communication apparatus comprising:
   a synchronization detection block receiving a frame and further receiving in parallel a plurality of clocks having different phases from each other to sample data included in said frame by using said plurality of clocks, to compare sampling results by said plurality of clocks and a predetermined synchronous pattern;
   a clock phase selection block coupled to said synchronization detection block to identify a first clock group consisting of a clock or clocks included in said plurality of clocks and to be stopped based on a result of comparing said sampling results with said synchronous pattern, and an eye opening ratio of an eye pattern relative to said frame; and
   a clock gate unit coupled to said clock phase selection block and said synchronization detection block to stop supplying said first clock group to said synchronization detection section, said synchronization detection block sampling said data without using said first clock group after said clock gate unit stops supplying said first clock group.

2. The communication apparatus according to claim 1, wherein said synchronization detection block identifies a second clock group consisting of a clock or clocks included in said plurality of clocks and capable of sampling said data correctly, and said clock phase selection block identifies said first clock group in accordance with said second clock group.

3. The communication apparatus according to claim 2, wherein said clock phase selection block selects one clock from said second clock group and identifies said first clock group based on both said selected one clock from said second clock group and said eye opening ratio.

4. The communication apparatus according to claim 2, wherein said synchronization detection block identifies said second clock group based on a result of sampling a synchronization word included in said frame.

5. The communication apparatus according to claim 1, wherein said synchronization detection block receives another frame following said frame and samples another data included in said another frame without using said first clock group.

6. The communication apparatus according to claim 1, wherein said clock phase selection block includes an eye opening ratio calculation unit calculating said eye opening ratio in accordance with said frame and identifies said first clock group in accordance with a result of calculating said eye opening ratio.

* * * * *